Patented Sept. 15, 1925.

1,553,321

UNITED STATES PATENT OFFICE.

ROY MACKAY MEIKLEJOHN, OF NEW YORK, N. Y., ASSIGNOR TO GENERAL CHEMICAL COMPANY, OF NEW YORK, N. Y., A CORPORATION OF NEW YORK.

HYDROFLUORIC ACID DRUM AND METHOD OF PASSIFYING THE SAME WITH RESPECT TO HYDROFLUORIC ACID.

No Drawing. Application filed October 5, 1923. Serial No. 666,844.

*To all whom it may concern:*

Be it known that I, ROY MACKAY MEIKLEJOHN, a citizen of Canada, and a resident of the city of New York, county of Queens, State of New York, have invented certain new and useful Improvements in Hydrofluoric Acid Drums and Methods of Passifying the Same with Respect to Hydrofluoric Acid, of which the following is a specification This invention relates to a treatment of drums adapted for the shipment of hydrofluoric acid and has for its object to prepare the drums in such a way as to render them passive with respect to their contents. Prior to the present invention it has been practically impossible to ship hydrofluoric acid in steel drums. I have discovered, however, that if such drums be given the treatment hereinafter described, they will become reliable and safe carriers of the acid, so that the shipment of hydrofluoric acid in such drums will become permissible.

In carrying out this invention the drums are first filled to approximately 90% capacity with hydrofluoric acid of 58% strength, they are then allowed to stand for forty-eight hours at a temperature of 80° F. The temperature is then raised to 140° F. and the drums remain for seven hours at the latter temperature. The pressures in the drums are maintained at atmospheric by means of a ventilated bung. The drums when thus treated are passified with respect to hydrofluoric acid. When shipped they should be filled to not over 90% capacity. The drums should not be washed with water as the passification crust is longer-lived if not washed. The acid to be shipped should be of not less than 60% strength. Drums thus prepared and containing hydrofluoric acid of the proper strength can now be safely shipped in carload lots.

The foregoing process has been applied industrially and has met with success. The above directions have been adopted by the Bureau of Explosives of the American Railway Association and have been published as standard regulations.

I claim:

1. A drum adapted for the transportation of strong hydrofluoric acid comprising a metal barrel having an interior passification crust, said crust being the result of filling the drum to approximately 90% capacity with hydrofluoric acid of approximately 58% strength and allowing it to stand approximately 48 hours at a temperature of approximately 80° F. and then approximately seven hours at approximately 140° F., the pressure being meanwhile maintained at atmospheric pressure by means of a ventilating bung.

2. The method of treating drums adapted for the transportation of strong hydrofluoric acid which comprises filling a steel drum to approximately 90% capacity with hydrofluoric acid of approximately 58% strength and allowing it to stand approximately forty-eight hours at a temperature approximately 80° F. and then approximately seven hours at approximately 140° F. and meanwhile maintaining the pressure at atmospheric pressure.

ROY MACKAY MEIKLEJOHN.